United States Patent
Morimoto et al.

(10) Patent No.: US 7,235,619 B2
(45) Date of Patent: Jun. 26, 2007

(54) SILSESQUIOXANE DERIVATIVE

(75) Inventors: Yoshitaka Morimoto, Yokohama (JP); Kenya Ito, Yokohama (JP); Hisaoi Oikawa, Yokohama (JP); Mikio Yamahiro, Yokohama (JP); Kenichi Watanabe, Yokohama (JP); Nobumasa Ootake, Yokohama (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 11/121,076

(22) Filed: May 4, 2005

(65) Prior Publication Data

US 2005/0215807 A1    Sep. 29, 2005

Related U.S. Application Data

(62) Division of application No. 10/634,859, filed on Aug. 6, 2003, now abandoned.

(30) Foreign Application Priority Data

Aug. 6, 2002 (JP) ............... 2002-228914
May 7, 2003 (JP) ............... 2003-129349

(51) Int. Cl.
    *C08G 77/16* (2006.01)
(52) U.S. Cl. .................. 528/34; 528/41; 528/42
(58) Field of Classification Search .............. 528/34, 528/41, 42
    See application file for complete search history.

(56) References Cited

U.S. PATENT DOCUMENTS 5,484,867 A    1/1996    Lichtenhan et al.
6,099,958 A *  8/2000    Mino et al. ............ 428/333
2003/0055193 A1  3/2003    Lichtenhan et al.

OTHER PUBLICATIONS

Frank J. Feher, et al., "Facile Syntheses of New Incompletely Condensed Polyhedral Oligosilsesquioxanes", Organometallics, 10, pp. 2526-2528, 1991.

Vincent Ruffieux, et al., "$T_8$-OSS-Ethyldiphenylphosphine: A New Functional Oligosilsesquioxane Ligand", Chem. Eur. J., 3, No. 6, pp. 900-903, 1997.

* cited by examiner

*Primary Examiner*—Kuo-Liang Peng
(74) *Attorney, Agent, or Firm*—Wenderoth, Lind & Ponack, L.L.P.

(57) ABSTRACT

A silsesquioxane derivative represented by Formula (2):

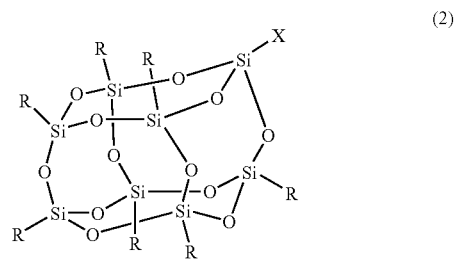

wherein R is hydrogen, an alkyl, an aryl, or an arylalkyl; and X is hydrogen, chlorine, a functional group, or a group having a functional group.

7 Claims, No Drawings

SILSESQUIOXANE DERIVATIVE

This application is a divisional application of Ser. No. 10/634,859, filed Aug. 6, 2003 now abandoned.

FIELD OF THE INVENTION

The present invention relates to a production process for a silsesquioxane derivative having a functional group and a silsesquioxane derivative obtained by this production process.

BACKGROUND OF THE INVENTION

A silsesquioxane derivative has an excellent heat resistance and weatherability, and therefore it is expected to be applied to a modifier for a thermoplastic resin, a interlayer dielectric, a sealing material, a flame retardant and an additive for a coating material. It has so far been tried to introduce various functional groups into silsesquioxane. Disclosed in Literature 1 is, for example, a process in which a compound having Si—OH shown below is synthesized and in which various functional groups are then introduced by reacting the compound with chlorosilanes. Disclosed in Literature 4 is a process in which a small amount of a basic compound is added when a compound having Si—OH shown below is reacted with trialkoxysilane in an organic solvent.

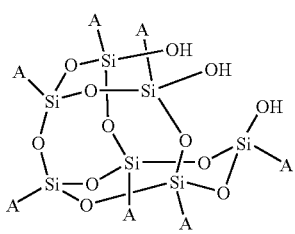

(a)

A in Formula (a) is the same group selected from hydrogen, methyl, ethyl, 2-methylpropyl, cyclohexyl, cyclopentyl, phenyl and vinylhexyl.

The compound represented by Formula (a) can be synthesized by hydrolyzing chlorosilane and further ripening the mixture. Disclosed by Frank J. Feher et al. in California University is, for example, a process in which cyclopentyltrichlorosilane is reacted at a room temperature or a refluxing temperature in a water-acetone mixed solvent and in which the reaction mixture is further ripened for 2 weeks (Literature 2 and Literature 3).

Literature 1: U.S. Pat. No. 5,484,867
Literature 2: Organometallics, 10, 2526-2528 (1991)
Literature 3: Chem. Eur. J, 3, No. 6, 900-903 (1997)
Literature 4: US 2003/0055193 A1

However, in order to industrially utilize them, the compound represented by Formula (a) can preferably be produced at a higher yield for shorter time with less by-products than those of such publicly known techniques. The process in which a functional group is introduced by reacting the compound represented by Formula (a) with chlorosilane has the industrial difficulty that by-produced hydrogen chloride has to be treated. Hydrogen chloride is not by-produced in the process of Literature 4, but it requires a very long reacting time. An object of the present invention is to provide a novel synthetic process for a functional group-containing silsesquioxane derivative and a novel compound obtained by this process in order to solve these problems.

SUMMARY OF THE INVENTION

First, a term used in the present invention shall be explained. The term "optional" shows that not only the position but also the number is optional. When the number is plural, they may be replaced by different groups respectively. For example, when two of —$CH_2$— are replaced by —O— or —CH═CH— in alkyl, alkoxyalkenyl and alkenyloxyalkyl are included in the alkyl. Alkyl and alkylene may be linear groups or branched groups in any cases. This shall apply when optional hydrogen is replaced by halogen or a cyclic group in these groups or when optional —$CH_2$— is replaced by —O—, —CH═CH—, cycloalkylene or cycloalkenylene. Any group of alkoxy, alkenylene, alkenyl and alkylene may be either a linear group or a branched group in such case. It is not preferred in the present invention either that a plurality of adjacent —$CH_2$— is replaced by —O— or that —$CH_2$— bonded to a silicon atom is replaced by —O—.

The present inventors have found a novel silicon compound represented by Formula (1) described later as an intermediate which can be used in order to achieve the object described above. The production process of the present invention is characterized by using the silicon compound represented by Formula (1) as the intermediate. According to this process, the reactivity is high, and less by-products are produced as compared with publicly known techniques. A novel silsesquioxane derivative is provided by the production process of the present invention. The silicon compound represented by Formula (1) can not be synthesized by the process of Feher described above. An example in which the compound represented by Formula (1) is used to synthesize a silicon compound represented by Formula (2) is not known as well. The present invention relates to a novel process in which the compound represented by Formula (1) is used to efficiently synthesize the compound represented by Formula (2).

The present invention comprises the following structures.

{1} A production process for a silsesquioxane derivative represented by Formula (2), characterized by using a silicon compound represented by Formula (1):

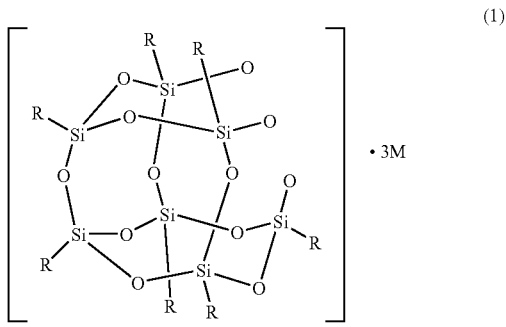

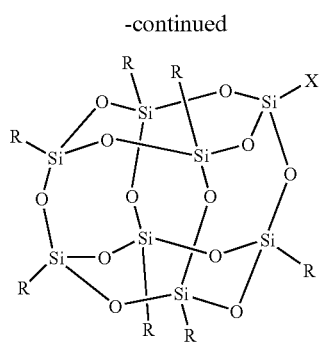

wherein in Formula (1), each of R's is a group selected independently from hydrogen, the group of alkyls having 1 to 45 carbon atoms, the group of substituted or non-substituted aryls and the group of substituted or non-substituted arylalkyls; in the alkyl having 1 to 45 carbon atoms, optional hydrogen may be replaced by fluorine, and optional —CH$_2$— may be replaced by —O—, —CH=CH—, cycloalkylene or cycloalkenylene; in alkylene of the substituted or non-substituted arylalkyl, optional hydrogen may be replaced by fluorine, and optional —CH$_2$— may be replaced by —O—, —CH=CH— or cycloalkylene; and M is a monovalent alkaline metal atom;

in Formula (2), R has the same meaning as that of R in Formula (1); and X is hydrogen, chlorine, a functional group or a group having a functional group;

provided that X is not any of a group having a hydroxy group which is not bonded directly to Si, a group having alkanoyloxy, a group having halogenated sulfonyl and a group having an α-haloester group.

{2} The production process as described in the item {1}, wherein each of R's in Formula (1) is a group selected independently from hydrogen, the group of alkyls in which the number of carbon atoms is 1 to 20, optional hydrogen may be replaced by fluorine and optional —CH$_2$— may be replaced by —O— or cycloalkylene, the group of alkenyls in which the number of carbon atoms is 2 to 20, optional hydrogen may be replaced by fluorine and optional —CH$_2$— may be replaced by —O— or cycloalkylene, the group of alkyls in which the number of carbon atoms is 1 to 10 and at least one —CH$_2$— is replaced by cycloalkenylene, the group of phenyls in which optional hydrogen on the benzene ring may be replaced by halogen or alkyl having 1 to 10 carbon atoms, the group of phenylalkyls in which optional hydrogen on the benzene ring may be replaced by halogen or alkyl having 1 to 10 carbon atoms, and naphthyl; in the alkyl having 1 to 10 carbon atoms which is a substituent on the benzene ring, optional hydrogen may be replaced by fluorine, and optional —CH$_2$— may be replaced by —O—, —CH=CH—, cycloalkylene or phenylene; and in alkylene of the phenylalkyl, the number of carbon atoms is 1 to 12 optional hydrogen may be replaced by fluorine, and optional —CH$_2$— may be replaced by —O—, —CH=CH— or cycloalkylene.

{3} The production process as described in the item {1}, wherein each of R's in Formula (1) is a group selected independently from the group of alkyls in which the number of carbon atoms is 1 to 10, optional hydrogen may be replaced by fluorine and optional —CH$_2$— may be replaced by —O— or cycloalkylene, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy, and naphthyl; and in alkylene of the phenylalkyl, the number of carbon atoms is 1 to 8, and optional —CH$_2$— may be replaced by —O—, —CH=CH— or cycloalkylene.

{4} The production process as described in the item 1, wherein all of R's in Formula (1) are the same group selected from the group of alkyls in which the number of carbon atoms is 1 to 10, optional hydrogen may be replaced by fluorine and optional —CH$_2$— may be replaced by —O— or cycloalkylene, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy, and naphthyl; and in alkylene of the phenylalkyl, the number of carbon atoms is 1 to 8, and optional —CH$_2$— may be replaced by —O—, —CH=CH— or cycloalkylene.

{5} The production process as described in any one of the items {1} to {4}, wherein M in Formula (1) as described in the item {1} is Na.

{6} The production process as described in any one of the items {1} to {4}, wherein M in Formula (1) as described in the item {1} is Na, and a step for reacting the silicon compound represented by Formula (1) with a silicon compound represented by Formula (3) is included therein:

wherein X has the same meaning as that of X in Formula (2) as described in the item {1}.

{7} The production process as described in the item {6}, wherein X is hydrogen, chlorine, alkenyl or a group having any of halogen, alkenyl, cycloalkenyl, cyano, alkoxy, phenoxy, acryloyloxy, methacryloyloxy and glycidyloxy;

provided that a group having halogenated sulfonyl and a group having an α-haloester group are not included in the group having halogen.

{8} A silsesquioxane derivative represented by Formula (2):

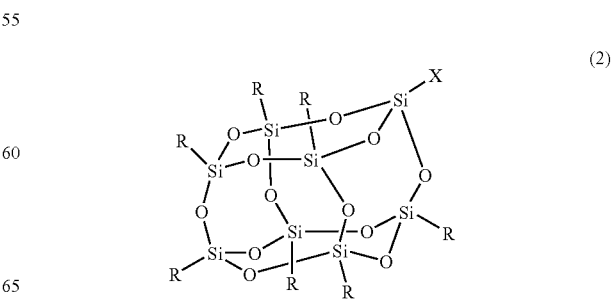

wherein each of R's is a group selected independently from the group of alkyls in which the number of carbon atoms is 1 to 20, at least one hydrogen is replaced by fluorine and optional —CH$_2$— may be replaced by —O—, the group of phenyls in which optional hydrogen on the benzene ring may be replaced by halogen or alkyl having 1 to 10 carbon atoms, the group of phenylalkyls in which optional hydrogen on the benzene ring may be replaced by halogen or alkyl having 1 to 10 carbon atoms, and naphthyl; in the alkyl having 1 to 10 carbon atoms which is a substituent on the benzene ring, optional hydrogen may be replaced by fluorine, and optional —CH$_2$— may be replaced by —O—, —CH=CH—, cycloalkylene or phenylene; in alkylene of the phenylalkyl, the number of carbon atoms is 1 to 12, optional hydrogen may be replaced by fluorine, and optional —CH$_2$— may be replaced by —O—, —CH=CH— or cycloalkylene; and X is hydrogen, chlorine, a functional group or a group having a functional group;

provided that X is not any of a group having a hydroxy group which is not bonded directly to Si, a group having alkanoyloxy, a group having halogenated sulfonyl and a group having an α-haloester group.

{9} The silsesquioxane derivative described in the item {8}, wherein each of R's in Formula (2) is a group selected independently from the group of alkyls in which the number of carbon atoms is 1 to 10, at least one hydrogen is replaced by fluorine and optional —CH$_2$— may be replaced by —O—, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy, and naphthyl; and in alkylene of the phenylalkyl, the number of carbon atoms is 1 to 8, and optional —CH$_2$— may be replaced by —O—, —CH=CH— or cycloalkylene.

{10} The silsesquioxane derivative as described in the item {8}, wherein all of R's are the same group selected from the group of alkyls in which the number of carbon atoms is 1 to 10, at least one hydrogen is replaced by fluorine and optional —CH$_2$— may be replaced by —O—, the group of phenyls in which optional hydrogen on the benzene ring may be replaced by halogen, methyl or methoxy, the group of phenylalkyls in which optional hydrogen on the benzene ring may be replaced by fluorine, alkyl having 1 to 4 carbon atoms, vinyl or methoxy, and naphthyl; and in alkylene of the phenylalkyl, the number of carbon atoms is 1 to 8, and optional —CH$_2$— may be replaced by —O—, —CH=CH— or cycloalkylene.

{11} The silsesquioxane derivative as described in the item {8}, wherein all of R's are the same alkyl in which the number of carbon atoms is 1 to 10, at least one hydrogen is replaced by fluorine, and one —CH$_2$— may be replaced by —O—.

{12} The silsesquioxane derivative as described in the item {8}, wherein all of R's in Formula (2) are phenyl.

{13} The silsesquioxane derivative as described in the item {8}, wherein all of R's in Formula (2) are trifluoropropyl.

{14} The silsesquioxane derivative as described in the item {8}, wherein all of R's in Formula (2) are tridecafluoro-1,1,2,2-tetrahydrooctyl.

{15} The silsesquioxane derivative as described in any one of the items {8} to {14}, wherein X in Formula (2) as described in the item {8} is hydrogen, chlorine, a hydroxy group, alkenyl, or a group having any of halogen, alkoxy, phenoxy, polyalkyleneoxy, —COOH, 2-oxapropane-1,3-dioyl, alkoxycarbonyl, alkenyloxycarbonyl, oxiranyl, 3,4-epoxycyclohexyl, oxetanyl, oxetanylene, —NH—, —NH$_2$, —CN, —NCO, alkenyl, alkynyl, cycloalkenyl, acryloyloxy, methacryloyloxy, —SH and —PH$_2$, provided that X is not any of a group having a hydroxy group which is not bonded directly to Si, a group having alkanoyloxy, a group having halogenated sulfonyl and a group having an α-haloester group.

{16} A silsesquioxane derivative represented by Formula (5):

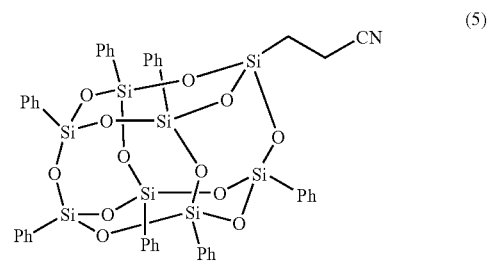

wherein Ph is phenyl.

{17} A silsesquioxane derivative represented by Formula (6):

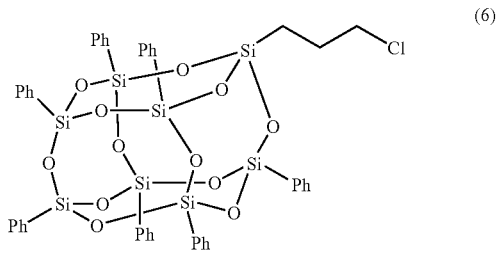

wherein Ph is phenyl.

{18} A silsesquioxane derivative represented by Formula (1-2):

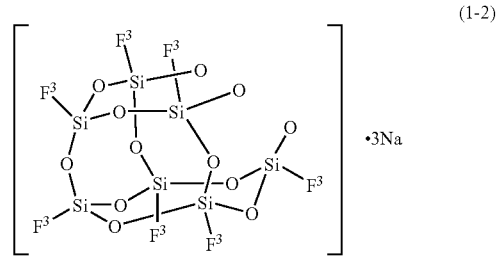

where in F$^3$ is —CH$_2$CH$_2$CF$_3$.

{19} A silsesquioxane derivative represented by Formula (14):

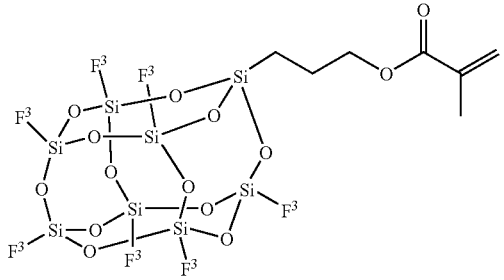

(14)

wherein $F^3$ is $-CH_2CH_2CF_3$.

{20} A silsesquioxane derivative represented by Formula (1-5):

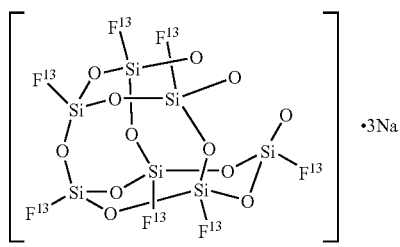

(1-5)

wherein $F^{13}$ is $-CH_2CH_2(CF_2)_5CF_3$.

DETAILED DESCRIPTION OF THE INVENTION

The silicon compound represented by Formula (1) shall be denoted by the compound (1) in the following explanation. The silicon compound represented by Formula (2) shall be denoted by the compound (2). The same shall be applied to the compounds represented by the other formulas.

The production process of the present invention for the compound (2) is characterized by using the compound (1):

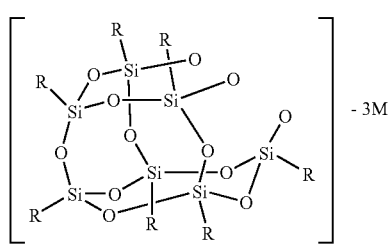

(1)

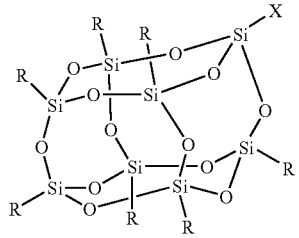

(2)

The compound (1) can readily be produced at a good yield by hydrolyzing a silicon compound having three hydrolyzable groups in an oxygen-containing organic solvent such as alcohol and ether in the presence of an alkaline metal hydroxide such as sodium hydroxide, and subjecting it to polycondensation. Success in synthesizing this compound (1) has made it possible to complete the production process of the present invention. That is, reaction of the compound (1) with the compound (3) has made it possible to easily synthesize for short time, the compound (2) into which X in the compound (3) is introduced. The compound (3) is chloride but may be other halide. X shall be described later.

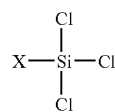

(3)

An organic solvent is preferably used for the reaction of the compound (1) with the compound (3). That is, the compound (1) is mixed with an organic solvent, and the compound (3) is dropwise added to this mixture, whereby the reaction goes on while by-producing chloride of alkaline metal. After finishing the reaction, water is added to dissolve the chloride described above and hydrolyze the unreacted compound (3). Then, the organic layer is separated from the mixture, and the solvent is removed by distillation, whereby the compound (2) can be obtained. The organic layer is washed with water and dried on a dehydrating agent before removing the solvent, whereby the compound having a high purity can be obtained. If the functional group introduced is a group reacting with water, the unreacted compound (3) and the organic solvent are advisably removed by distillation after removing the chloride by filtration. In either case, the purity can be enhanced by carrying out, if necessary, recrystallization.

The solvent described above used in the reaction shall not specifically be restricted as long as it does not retard progress of the reaction. The preferred solvent includes aliphatic hydrocarbons (hexane, heptane and the like), aromatic hydrocarbons (benzene, toluene, xylene and the like), ethers (diethyl ether, tetrahydrofuran (THF), dioxane and the like), halogenated hydrocarbons (methylene chloride, carbon tetrachloride and the like) and esters (ethyl acetate and the like). These solvents may be used alone or in combination of a plurality thereof. More preferred solvents are ethers, and THF is most preferred. The compound (3) is readily reacted with water, and therefore the solvent having a very small moisture content is preferably used.

A preferred proportion of the compound (1) in mixing with the solvent is 0.05 to 50% by weight based on the weight of the solvent. If it is 50% by weight or less, a concentration of the by-produced salts can be controlled so that it is not such high as retarding progress of the reaction. If it is 0.05% by weight or more, the volume efficiency can be prevented from being so deteriorated that an adverse effect is exerted on the cost. More preferred proportion is 1 to 10% by weight. A use amount of the compound (3) shall not be restricted as long as it is used in an equivalent mole or more based on the compound (1), but considering an after-treatment step, it is not preferably used in an excessive amount. The reaction temperature may be a room temperature, and heating may be carried out, if necessary, in order to accelerate the reaction. Further, cooling may be carried out, if necessary, in order to control heat generated by the reaction or undesirable reactions.

This reaction can readily be accelerated by adding a compound having an amino group such as triethylamine or an organic compound showing basicity. To give an example in which triethylamine is used, a preferred use amount thereof falls in a range of 0.005 to 10% by weight, more preferably 0.01 to 3% by weight based on the weight of the solvent. However, an added amount of triethylamine shall not specifically be basically restricted as long as the reaction can readily be accelerated. A particularly excellent point of the production process of the present invention is a short reaction time. The reaction time after dropwise adding the compound (3) may be about one hour in almost all cases. The reaction is finished in about 3 hours at the longest.

In Formula (1), each of R's is a group selected independently from hydrogen, alkyl having 1 to 45 carbon atoms, substituted or non-substituted aryl and substituted or non-substituted arylalkyl. All of R's are preferably the same one group, but they may be constituted from two or more different groups. An example in which R's are constituted from at least two different groups includes an example in which they are constituted from two or more alkyls, an example in which they are constituted from two or more aryls, an example in which they are constituted from two or more aralkyls, an example in which they are constituted from hydrogen and at least one aryl, an example in which they are constituted from at least one alkyl and at least one aryl, an example in which they are constituted from at least one alkyl and at least one aralkyl, and an example in which they are constituted from at least one aryl and at least one aralkyl. They may be combinations other than these examples. The compound (1) having at least two different R's can be obtained by using two or more raw materials in producing it.

When R is alkyl, it has 1 to 45 carbon atoms, preferably 1 to about 20 carbon atoms. Optional —$CH_2$— in this alkyl may be replaced by —O—, —CH=CH—, cycloalkylene or cycloalkenylene. The preferred examples in which R is alkyl or its related group described above, are alkyl in which the number of carbon atoms is 1 to 20, optional hydrogen may be replaced by fluorine and optional —$CH_2$— may be replaced by —O— or cycloalkylene, alkenyl in which the number of carbon atoms is 2 to 20, optional hydrogen may be replaced by fluorine and optional —$CH_2$— may be replaced by —O— or cycloalkylene, and alkyl in which the number of carbon atoms is 1 to 10 and at least one —$CH_2$— is replaced by cycloalkenylene.

The examples of such groups are alkyl having 1 to 20 carbon atoms, alkoxyalkyl having 2 to 20 carbon atoms, alkyl in which the number of carbon atoms is 1 to 10 and at least one —$CH_2$— is replaced by cycloalkylene, alkenyl having 2 to 20 carbon atoms, alkenyloxyalkyl having 2 to 20 carbon atoms, alkoxyalkenyl having 2 to 20 carbon atoms, alkyl in which the number of carbon atoms is 1 to 10 and at least one —$CH_2$— is replaced by cycloalkenylene, and groups obtained by substituting optional hydrogens with fluorine in the groups given above. In the cycloalkylene and the cycloalkenylene, they have preferably 3 to 8 carbon atoms, and two carbons which are not adjacent to each other may be cross-linked.

The examples of the alkyl having 1 to 20 carbon atoms are methyl, ethyl, propyl, 1-methylethyl, butyl, 2-methylpropyl, 1,1-dimethylethyl, pentyl, hexyl, 1,1,2-trimethylpropyl, heptyl, octyl, 2,4,4-trimethylpentyl, nonyl, decyl, undecyl, dodecyl, tetradecyl, hexadecyl, octadecyl, eicocyl and docoсyl.

The examples of the alkoxyalkyl having 2 to 20 carbon atoms are methyloxypropyl, ethyloxypropyl, propyloxypropyl, methyloxybutyl, ethyloxybutyl, propyloxybutyl, methyloxyisobutyl, ethyloxyisobutyl and propyloxyisobutyl.

The examples of the alkyl in which the number of carbon atoms is 1 to 10 and one —$CH_2$— is replaced by cycloalkylene, are cyclohexylmethyl, adamantaneethyl, cyclopentyl, cyclohexyl, 2-bicycloheptyl and cyclooctyl. Cyclohexyl is an example in which —$CH_2$— in methyl is replaced by cyclohexylene. Cyclohexylmethyl is an example in which the 2nd —$CH_2$— in ethyl is replaced by cyclohexylene.

The examples of the alkenyl having 2 to 20 carbon atoms, are vinyl, 2-propenyl, 3-butenyl, 5-hexenyl, 7-octenyl, 10-undecenyl and 21-dococenyl. The example of the alkenyloxyalkyl having 2 to 20 carbon atoms is allyloxyundecyl.

The examples of the alkyl in which the number of carbon atoms is 1 to 10 and one —$CH_2$— is replaced by cycloalkenylene, are 2-(3-cyclohexenyl)ethyl, 5-(bicycloheptenyl) ethyl, 2-cyclopentenyl, 3-cyclohexenyl, 5-norbornene-2-yl and 4-cyclooctenyl.

More preferred example in which R is alkyl or its related group described above, is alkyl in which the number of carbon atoms is 1 to 10, at least one hydrogen is replaced by fluorine and one —$CH_2$— may be replaced by —O—. In this case, it is not preferred that —$CH_2$— bonded to Si is replaced by —O—. It is not preferred as well that —$CH_2$— at a terminal is replaced by —O—.

The examples of such preferable alkyl are trifluoromethyl, 2-fluoroethyl, 2,2-difluoroethyl, 3,3,3-trifluoropropyl, hexafluoropropyl, tridecafluoro-1,1,2,2-tetrahydrooctyl, 3,3,4,4,5,5,6,6,6-nonafluorohexyl, heptadecafluoro-1,1,2,2-tetrahydrodecyl, 2-fluoroethyloxypropyl, 2,2,2-trifluoroethyloxypropyl, 2-fluoro-1-fluoromethylethyloxypropyl, 2,2,3,3-tetrafluoro-propyloxypropyl, 2,2,3,3,3-pentafluoropropyloxypropyl, hexafluoroisopropyloxypropyl, hexafluorobutyloxypropyl, heptafluorobutyloxypropyl, octafluoroisobutyloxypropyl, octafluoropentyloxypropyl, 2-fluoroethyloxybutyl, 2,2,2-trifluoroethyloxybutyl, 2-fluoro-1-fluoromethylethyloxy-butyl, 2,2,3,3-tetrafluoropropyloxybutyl, 2,2,3,3,3-pentafluoropropyloxybutyl, hexafluoroisopropyloxybutyl, hexafluorobutyloxybutyl, heptafluorobutyloxybutyl, octafluoroisobutyloxybutyl, octafluoropentyloxybutyl, 2-fluoroethyloxyisobutyl, 2,2,2-trifluoroethyloxyisobutyl, 2-fluoro-1-fluoromethylethyloxyisobutyl, 2,2,3,3-tetrafluoropropyloxyisobutyl, 2,2,3,3,3-pentafluoropropyloxyisobutyl, hexafluoroisopropyloxy-isobutyl, hexafluorobutyloxyisobutyl, heptafluorobutyloxyisobutyl, octafluoroisobutyloxy-isobutyl and octafluoropentyloxyisobutyl.

The preferred examples in which R in Formula (1) is substituted or non-substituted aryl, are phenyl in which optional hydrogen may be replaced by halogen or alkyl having 1 to 10 carbon atoms, and naphthyl. The preferred examples of halogen are fluorine, chlorine and bromine. In the alkyl having 1 to 10 carbon atoms which is a substituent for the phenyl, optional hydrogen may be replaced by fluorine, and optional —$CH_2$— may be replaced by —O—, —CH═CH— or phenylene.

That is, the preferred examples of substituted or non-substituted aryl are phenyl, naphthyl, halogenated phenyl, alkylphenyl, alkoxyphenyl, alkenylphenyl, phenyl having alkyl in which the number of carbon atoms is 1 to 10, at least one —$CH_2$— is replaced by phenylene and optional —$CH_2$— may be replaced by —O— or —CH═CH— as a substituent, and groups obtained by substituting optional hydrogens with fluorine in the groups given above. In the present invention, phenyl described simply unless otherwise defined means non-substituted phenyl. The same shall apply to naphthyl.

The examples of the halogenated phenyl are pentafluorophenyl, 4-chlorophenyl and 4-bromophenyl. The examples of the alkylphenyl are 4-methylphenyl, 4-ethylphenyl, 4-propylphenyl, 4-butylphenyl, 4-pentylphenyl, 4-heptylphenyl, 4-octylphenyl, 4-nonylphenyl, 4-decylphenyl, 2,4-dimethylphenyl, 2,4,6-trimethylphenyl, 2,4,6-triethylphenyl, 4-(1-methylethyl)-phenyl, 4-(1,1-dimethylethyl)phenyl, 4-(2-ethylhexyl)-phenyl and 2,4,6-tris(1-methylethyl)phenyl.

The examples of the alkoxyphenyl are 4-methoxy-phenyl, 4-ethoxyphenyl, 4-propoxyphenyl, 4-butoxyphenyl, 4-pentyloxyphenyl, 4-heptyloxyphenyl, 4-decyloxyphenyl, 4-octadecyloxyphenyl, 4-(1-methylethoxy)-phenyl, 4-(2-methylpropoxy)phenyl and 4-(1,1-dimethylethoxy)phenyl.

The examples of the alkenylphenyl are 4-vinylphenyl, 4-(1-methylvinyl)phenyl and 4-(3-butenyl)phenyl.

The examples of the phenyl having alkyl in which the number of carbon atoms is 1 to 10, at least one —$CH_2$— is replaced by phenylene and optional —$CH_2$— may be replaced by —O— or —CH═CH— as a substituent, are 4-(2-phenylvinyl)phenyl, 4-phenoxyphenyl, 3-phenylmethylphenyl, biphenyl and terphenyl. 4-(2-Phenylvinyl)phenyl is an example which in ethylphenyl the 2nd —$CH_2$— of ethyl is replaced by phenylene and another —$CH_2$— is replaced by —CH═CH—.

The examples of the phenyl in which at least one hydrogen on the benzene ring is replaced by halogen and another hydrogen is replaced by alkyl, alkoxy or alkenyl, are 3-chloro-4-methylphenyl, 2,5-dichloro-4-methylphenyl, 3,5-dichloro-4-methylphenyl, 2,3,5-trichloro-4-methyl-phenyl, 2,3,6-trichloro-4-methylphenyl, 3-bromo-4-methylphenyl, 2,5-dibromo-4-methylphenyl, 3,5-dibromo-4-methylphenyl, 2,3-difluoro-4-methylphenyl, 3-chloro-4-methoxyphenyl, 3-bromo-4-methoxyphenyl, 3,5-dibromo-4-methoxyphenyl, 2,3-difluoro-4-methoxyphenyl, 2,3-difluoro-4-ethoxyphenyl, 2,3-difluoro-4-propoxyphenyl and 4-vinyl-2,3,5,6-tetrafluorophenyl.

Next, an example in which R is substituted or non-substituted arylalkyl shall be given. In alkylene of the arylalkyl, optional hydrogen may be replaced by fluorine, and optional —$CH_2$— may be replaced by —O—, —CH═CH— or cycloalkylene. The preferred example of the arylalkyl is phenylalkyl. Alkylene in this phenylalkyl has preferably 1 to 12 carbon atoms, more preferably 1 to 8 carbon atoms. The examples of the unsubstituted phenylalkyl are phenylmethyl, 2-phenylethyl, 3-phenylpropyl, 4-phenyl-butyl, 5-phenylpentyl, 6-phenylhexyl, 11-phenylundecyl, 1-phenylethyl, 2-phenylpropyl, 1-methyl-2-phenylethyl, 1-phenylpropyl, 3-phenylbutyl, 1-methyl-3-phenylpropyl, 2-phenylbutyl, 2-methyl-2-phenylpropyl and 1-phenylhexyl.

In the phenylalkyl, optional hydrogen on the benzene ring may be replaced by halogen or alkyl having 1 to 10 carbon atoms. In this alkyl having 1 to 10 carbon atoms, optional hydrogen may be replaced by fluorine, and optional —$CH_2$— may be replaced by —O—, —CH═CH—, cycloalkylene or phenylene. The examples of the phenylalkyl in which optional hydrogen on the benzene ring is replaced by fluorine, are 4-fluorophenylmethyl, 2,3,4,5,6-pentafluorophenylmethyl, 2-(2,3,4,5,6-pentafluorophenyl)ethyl, 3-(2,3,4,5,6-pentafluorophenyl)propyl, 2-(2-fluorophenyl)propyl and 2-(4-fluorophenyl)propyl.

The examples of the phenylalkyl in which optional hydrogen on the benzene ring is replaced by chlorine, are 4-chlorophenylmethyl, 2-chlorophenylmethyl, 2,6-dichlorophenylmethyl, 2,4-dichlorophenylmethyl, 2,3,6-trichlorophenylmethyl, 2,4,6-trichlorophenylmethyl, 2,4,5-trichlorophenylmethyl, 2,3,4,6-tetrachlorophenylmethyl, 2,3,4,5,6-pentachlorophenylmethyl, 2-(2-chlorophenyl)ethyl, 2-(4-chlorophenyl)ethyl, 2-(2,4,5-trichlorophenyl)ethyl, 2-(2,3,6-trichlorophenyl)ethyl, 3-(3-chlorophenyl)propyl, 3-(4-chlorophenyl)propyl, 3-(2,4,5-trichlorophenyl)propyl, 3-(2,3,6-trichlorophenyl)propyl, 4-(2-chlorophenyl)butyl, 4-(3-chlorophenyl)butyl, 4-(4-chlorophenyl)butyl, 4-(2,3,6-trichlorophenyl)butyl, 4-(2,4,5-trichlorophenyl)butyl, 1-(3-chlorophenyl)ethyl, 1-(4-chlorophenyl)ethyl, 2-(4-chlorophenyl)propyl, 2-(2-chlorophenyl)propyl and 1-(4-chlorophenyl)butyl.

The examples of phenylalkyl in which optional hydrogen on the benzene ring is replaced by bromine, are 2-bromophenylmethyl, 4-bromophenylmethyl, 2,4-dibromophenylmethyl, 2,4,6-tribromophenylmethyl, 2,3,4,5-tetrabromophenylmethyl, 2,3,4,5,6-pentabromophenylmethyl, 2-(4-bromophenyl)ethyl, 3-(4-bromophenyl)propyl, 3-(3-bromophenyl)propyl, 4-(4-bromophenyl)butyl, 1-(4-bromophenyl)ethyl, 2-(2-bromophenyl)propyl and 2-(4-bromophenyl)propyl.

The examples of the phenylalkyl in which optional hydrogen on the benzene ring is replaced by alkyl having 1 to 10 carbon atoms, are 2-methylphenylmethyl, 3-methylphenylmethyl, 4-methylphenylmethyl, 4-dodecylphenylmethyl, 3,5-dimethylphenylmethyl, 2-(4-methylphenyl)ethyl, 2-(3-methylphenyl)ethyl, 2-(2,5-dimethylphenyl)ethyl, 2-(4-ethylphenyl)ethyl, 2-(3-ethylphenyl)ethyl, 1-(4-methylphenyl)ethyl, 1-(3-methylphenyl)ethyl, 1-(2-methylphenyl)ethyl, 2-(4-methylphenyl)propyl, 2-(2-methylphenyl)propyl, 2-(4-ethylphenyl)propyl, 2-(2-ethylphenyl)propyl, 2-(2,3-dimethylphenyl)propyl, 2-(2,5-dimethylphenyl)propyl, 2-(3,5-dimethylphenyl)propyl, 2-(2,4-dimethylphenyl)propyl, 2-(3,4-dimethylphenyl)propyl, 2-(2,5-dimethylphenyl)butyl, 4-(1-methylethyl)phenylmethyl, 2-(4-(1,1-dimethylethyl)phenyl)ethyl, 2-(4-(1-methylethyl)phenyl)-propyl and 2-(3-(1-methylethyl)phenyl)propyl.

The examples of the phenylalkyl in which optional hydrogen on the benzene ring is replaced by alkyl having 1 to 10 carbon atoms and at least one hydrogen in this alkyl is replaced by fluorine, are 3-trifluoromethylphenylmethyl and 2-(4-trifluoromethylphenyl)ethyl, 2-(4-nonafluorobutylphenyl)-ethyl, 2-(4-tridecafluorohexylphenyl)ethyl, 2-(4-heptadecafluorooctylphenyl)ethyl, 1-(3-trifluoromethylphenyl)ethyl, 1-(4-trifluoromethylphenyl)-ethyl, 1-(4- nonafluorobutylphenyl)ethyl, 1-(4-tridecafluorohexylphenyl)ethyl, 1-(4-heptadecafluorooctylphenyl)ethyl, 2-(4-nonafluorobutylphenyl)propyl, 1-methyl-1-(4-nonafluorobutylphenyl)ethyl, 2-(4-tridecafluorohexyl-phenyl)propyl, 1-methyl-1-(4-tridecafluorohexyl-phenyl) ethyl, 2-(4-heptadecafluorooctylphenyl)propyl and 1-methyl-1-(4-heptadecafluorooctylphenyl)ethyl.

The examples of the phenylalkyl in which optional hydrogen on the benzene ring is replaced by alkyl having 1 to 10 carbon atoms and —CH$_2$— in this alkyl is replaced by —CH=CH—, are 2-(4-vinylphenyl)ethyl, 1-(4-vinylphenyl)ethyl and 1-(2-(2-propenyl)phenyl)ethyl.

The examples of the phenylalkyl in which optional hydrogen on the benzene ring is replaced by alkyl having 1 to 10 carbon atoms and —CH$_2$— in this alkyl is replaced by —O—, are 4-methoxyphenylmethyl, 3-methoxyphenylmethyl, 4-ethoxyphenylmethyl, 2-(4-methoxyphenyl)ethyl, 3-(4-methoxyphenyl)propyl, 3-(2-methoxyphenyl)propyl, 3-(3,4-dimethoxyphenyl)propyl, 11-(4-methoxyphenyl)undecyl, 1-(4-methoxyphenyl)ethyl, (3-methoxymethylphenyl)ethyl and 3-(2-nonadecafluorodecenyloxyphenyl)propyl.

The examples of the phenylalkyl in which optional hydrogen on the benzene ring is replaced by alkyl having 1 to 10 carbon atoms and one of —CH$_2$— in this alkyl is replaced by cycloalkylene are, to give the examples thereof including those in which another —CH$_2$— is replaced by —O—, cyclopentylphenylmethyl, cyclopentyloxyphenylmethyl, cyclohexylphenylmethyl, cyclohexylphenylethyl, cyclohexylphenylpropyl and cyclohexyloxyphenylmethyl.

The examples of the phenylalkyl in which optional hydrogen on the benzene ring is replaced by alkyl having 1 to 10 carbon atoms and one of —CH$_2$— in this alkyl is replaced by phenylene are, to give the examples thereof including those in which another —CH$_2$— is replaced by —O—, 2-(4-phenoxyphenyl)ethyl, 2-(4-phenoxyphenyl)propyl, 2-(2-phenoxyphenyl)propyl, 4-biphenylylmethyl, 3-biphenylylethyl, 4-biphenylylethyl, 4-biphenylylpropyl, 2-(2-biphenylyl)propyl and 2-(4-biphenylyl)propyl.

The examples of the phenylalkyl in which at least two hydrogen on the benzene ring are replaced by diffrent groups respectively, are 3-(2,5-dimethoxy-3,4,6-trimethylphenyl) propyl, 3-chloro-2-methylphenylmethyl, 4-chloro-2-methylphenylmethyl, 5-chloro-2-methylphenylmethyl, 6-chloro-2-methylphenylmethyl, 2-chloro-4-methylphenylmethyl, 3-chloro-4-methylphenylmethyl, 2,3-dichloro-4-methylphenylmethyl, 2,5-dichloro-4-methylphenylmethyl, 3,5-dichloro-4-methylphenylmethyl, 2,3,5-trichloro-4-methylphenylmethyl, 2,3,5,6-tetrachloro-4-methylphenylmethyl, 2,3,4,6-tetrachloro-5-methylphenylmethyl, 2,3,4,5-tetrachloro-6-methylphenylmethyl, 4-chloro-3,5-dimethylphenylmethyl, 2-chloro-3,5-dimethylphenylmethyl, 2,4-dichloro-3,5-dimethylphenylmethyl, 2,6-dichloro-3,5-dimethylphenylmethyl, 2,4,6-trichloro-3,5-dimethylphenylmethyl, 3-bromo-2-methylphenylmethyl, 4-bromo-2-methylphenylmethyl, 5-bromo-2-methylphenylmethyl, 6-bromo-2-methylphenylmethyl, 3-bromo-4-methylphenylmethyl, 2,3-dibromo-4-methylphenylmethyl, 2,3,5-tribromo-4-methylphenylmethyl, 2,3,5,6-tetrabromo-4-methylphenylmethyl and 11-(3-chloro-4-methoxyphenyl) undecyl.

The most preferred examples of phenyl group in the phenylalkyl are non-substituted phenyl and phenyl having at least one of fluorine, alkyl having 1 to 4 carbon atoms, vinyl and methoxy as a substituent.

The examples of the phenylalkyl in which —CH$_2$— in alkylene is replaced by —O—, —CH=CH— or cycloalkylene, are 3-phenoxypropyl, 1-phenylvinyl, 2-phenylvinyl, 3-phenyl-2-propenyl, 4-phenyl-4-pentenyl, 13-phenyl-12-tridecenyl, phenylcyclohexyl and phenoxycyclohexyl.

The examples of the phenylalkenyl in which hydrogen on the benzene ring is replaced by fluorine or methyl, are 4-fluorophenylvinyl, 2,3-difluorophenylvinyl, 2,3,4,5,6-pentafluorophenylvinyl and 4-methylphenylvinyl.

Preferred R among the examples described above are the alkyl in which the number of carbon atoms is 1 to 10, optional hydrogen may be replaced by fluorine and optional —CH$_2$— may be replaced by —O— or cycloalkylene, the phenyl in which optional hydrogen may be replaced by halogen, methyl or methoxy, and the phenylalkyl in which optional hydrogen on the benzene ring may be replaced by fluorine, alkyl having 1 to 4 carbon atoms, vinyl or methoxy. Alkylene in this phenylalkyl has 1 to 8 carbon atoms, and optional —CH$_2$— in this alkylene may be replaced by —O—, —CH=CH— or cycloalkylene. When phenyl has plural substituents in the preferred examples of R described above, these substituents may be the same groups or different groups. All of R's in Formula (1) are preferably the same group selected from these preferred examples of R.

More preffered examples of R are 3,3,3-trifluoropropyl, hexafluoropropyl, tridecafluoro-1,1,2,2-tetrahydrooctyl, 3,3,4,4,5,5,6,6-nonafluorohexyl, heptadecafluoro-1,1,2,2-tetrahydrodecyl, 2-fluoroethyloxypropyl, 2,2,2-trifluoroethyloxypropyl, 2-fluoro-1-fluoromethylethyloxypropyl, 2,2,3,3-tetrafluoropropyloxypropyl, 2,2,3,3,3-pentafluoropropyloxypropyl, hexafluoroisopropyloxypropyl, hexafluorobutyloxypropyl, heptafluorobutyloxypropyl, octafluoroisobutyloxypropyl, octafluoropentyloxypropyl, phenyl, halogenated phenyl, phenyl in which at least one hydrogen on the benzene ring is replaced by methyl, methoxyphenyl, naphthyl, phenylmethyl, phenylethyl, phenylbutyl, 2-phenylpropyl, 1-methyl-2-phenylethyl, pentafluorophenylpropyl, 4-ethylphenylethyl, 3-ethylphenylethyl, 4-(1,1-dimethylethyl) phenylethyl, 4-vinylphenylethyl, 1-(4-vinylphenyl)ethyl, 4-methoxyphenylpropyl and phenoxypropyl.

The most preffered examples of R are 3,3,3-trifluoropropyl, tridecafluoro-1,1,2,2-tetrahydrooctyl and phenyl.

Next, the compound (3) shall be explained. The examples of X in Formula (3) are hydrogen bonded to Si, chlorine bonded to Si, alkenyl bonded to Si, and a group having any of halogen, alkenyl, cycloalkenyl, cyano, alkoxy, phenoxy, acryloyloxy, methacryloyloxy and glycidyloxy, provided that a group having halogenated sulfonyl and a group having an α-haloester group are not included in the group having halogen.

The examples of the compound (3) described above are trichlorosilane, tetrachlorosilane, 3-acryloyloxypropyltrichlorosilane, allyltrichlorosilane, 5-bicycloheptenyltrichlorosilane, 2-bromoethyltrichlorosilane, bromophenyltrichlorosilane, 3-bromopropyltrichlorosilane, 11-bromoundecyltrichlorosilane, 2-(methoxycarbonyl)ethyltrichlorosilane, 1-chloroethyltrichlorosilane, 2-chloroethyltrichlorosilane, 1-chloro-2-methylallyltrichlorosilane, 2-(chloromethyl)allyltrichlorosilane, chloromethylphenethyltrichlorosilane, p-chloromethylphenyltrichlorosilane, chloromethyltrichlorosilane, chlorophenyltrichlorosilane, 3-chloropropyltrichlorosilane, 3-glycidyloxypropyltrichlorosilane, 3-cyanobutyltrichlorosilane, 2-cyanoethyltrichlorosilane, 3-cyanopropyltrichlorosilane, 2-(3-cyclohexenyl) ethyltrichlorosilane, 3-cyclohexenyltrichlorosilane, 4-cyclooctenyltrichlorosilane, 1,2-dibromoethyltrichlorosilane, 1,2-dichloroethyltrichlorosilane, dichloromethyltrichlorosilane, dichlorophenyltrichlorosilane, 5-hexenyltrichlorosilane, methacryloyloxypropyltrichlorosilane, 3-(p-methoxyphenyl)propyltrichlorosilane, 7-octenyltrichlorosilane, 3-phenoxypropyltrichlorosilane, trichloromethyltrichlorosilane, 2-[2-(trichlorosilyl)-ethyl]pyridine, 4-[2-(trichlorosilyl)ethyl]pyridine and vinyltrichlorosilane.

Use of these compounds makes it possible to synthesize silsesquioxane derivatives into which the respective functional groups are introduced. The compound (1) is reacted with the compound (3) to introduce X, and then it can be converted to the other functional group by making use of a reactivity of X. When X is hydrogen, very many functional groups can be introduced by hydrosilylation of a compound having a double bond at a terminal and a functional group, with the compound (2). If chlorine, bromine or iodine is included in X in Formula (2), this silsesquioxane derivative is dissolved in acetone to prepare a dilute solution, and then silver perchlorate is added thereto, whereby the halogen described above can be converted to alcohol. After the reaction is carried out for several hours at a room temperature, silver chloride is removed by filtration, and then acetone is removed under reduced pressure, whereby the product can be obtained. When tetrachlorosilane is used, reactive silyl chloride is introduced. If two equivalent of phosphineimine is reacted therewith, a Wittig reaction reagent can be obtained. It can further be converted as well to the other functional groups by publicly known techniques.

Examples other than the functional groups included in the examples of the compound (3) described above shall be shown below:

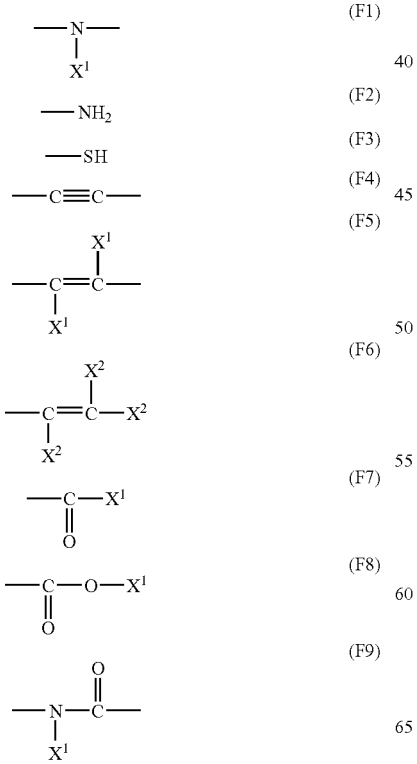

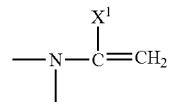

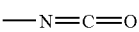

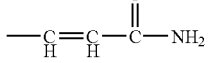

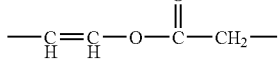

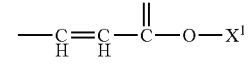

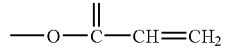

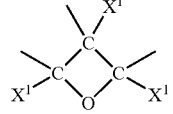

In these formulas, $X^1$ represents independently hydrogen or a substituent having no reactivity; $X^2$ represents independently fluorine, chlorine, bromine or a substituent having no reactivity; $X^3$ represents a functional organic silicon group; and —OH represents a hydroxy group bonded directly to Si. Specific examples of an oxetane ring (F19) shall be shown below:

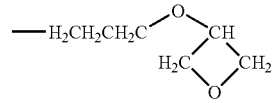

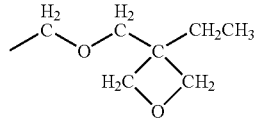

That is, the examples of X in the compound (2) are hydrogen bonded to Si, chlorine bonded to Si, a hydroxy group bonded to Si, alkenyl bonded to Si, and a group having any of halogen, alkoxy, phenoxy, polyalkyleneoxy, —COOH, 2-oxapropane-1,3-dioyl, alkoxycarbonyl, alkenyloxycarbonyl, oxiranyl, 3,4-epoxycyclohexyl, oxetanyl, oxetanylene, —NH—, —NH$_2$, —CN, —NCO, alkenyl, alkynyl, cycloalkenyl, acryloyloxy, methacryloyloxy, —SH and —PH$_2$, provided that X is not any of a group having alkanoyloxy, a group having halogenated sulfonyl and a group having an α-haloester bond.

When the functional group is a polymerizable group, it can be a homopolymer of the compound (2) or a copolymer with other conventional monomers. It may be a copolymer of the compounds (2) themselves. In this case, any of conventional methods can be used for the polymerizing method.

EXAMPLES

The present invention shall be explained below with reference to examples, but the present invention shall not be restricted to these examples. In chemical formulas in the examples, Ph is phenyl; TMS is trimethylsilyl; and i-Bu is isobutyl.

Example 1

Synthesis of Compound (1-1)

A four neck flask having an inner volume of 1 liter equipped with a reflux condenser, a thermometer and a dropping funnel was charged with phenyltrimethoxysilane (99 g), sodium hydroxide (10 g) and 2-propanol (500 ml). Deionized water (11 g) was dropwise added at a room temperature in about 2 minutes while stirring by means of a magnetic stirrer. Then, the solution was heated in an oil bath up to a temperature at which 2-propanol was refluxed. Stirring was continued for 1.5 hour since refluxing started to complete the reaction. Then, the flask was pulled up from the oil bath and left standing still at a room temperature for a night to completely deposit a product. A pressure filter equipped with a membrane filter having a pore diameter of 0.1 μm was used to filter the deposited product. Then, a solid matter thus obtained was washed once with 2-propanol, and it was dried at 70° C. for 4 hours in a vacuum dryer to obtain a white powder solid matter of 66 g.

Example 2

Confirmation of Structure of Compound (1-1)

A four neck flask having an inner volume of 50 ml equipped with a dropping funnel, a reflux condenser and a thermometer was charged with the white powder solid matter (1.2 g) described above, THF (12 g) and triethylamine (1.8 g) and sealed under dry nitrogen. Chlorotrimethylsilane (2.3 g) was dropwise added at a room temperature in about one minute while stirring by means of a magnetic stirrer. After finishing dropwise adding, stirring was further continued at a room temperature for 3 hours to complete the reaction. Then, deionized water (10 g) was added thereto to dissolve by-produced sodium chloride and hydrolyze unreacted chlorotrimethylsilane. The reaction mixture thus obtained was transferred to a separating funnel to separate an organic layer from an aqueous layer, and the resulting organic layer was repeatedly washed with water until the washing solution was neutralized. This organic layer was dried on anhydrous magnesium sulfate and concentrated under reduced pressure by means of a rotary evaporator to obtain a white powder solid matter of 1.2 g.

The white powder solid matter thus obtained was used to carry out structural analysis by means of gel permeation chromatography (GPC), $^1$H-NMR, $^{29}$Si-NMR and IR analysis. It was confirmed from the GPC chart that the white powder solid matter showed monodispersibility and that it had a weight average molecular weight of 900 in terms of polystyrene and a purity of 98% by weight. It was confirmed from the $^1$H-NMR chart that a phenyl group and a trimethylsilyl group were present in an integral ratio of 7:3. It was confirmed from the $^{29}$Si-NMR chart that three peaks originating in a T structure having phenyl were present in a ratio of 1:3:3 and that one peak originating in a trimethylsilyl group was present in 11.66 ppm. It was confirmed from the IR spectrum measured by a KBr tablet method that present in the spectrum of the white powder solid matter obtained above were absorptions attributed respectively to deformation vibration of Si—Ph in 1430 and 1590 cm$^{-1}$, harmonic vibration of a substituted benzene ring in 1960 to 1760 cm$^{-1}$, stretching vibration of Si—O—Si in 1200 to 950 cm$^{-1}$ and vibration of Si—CH$_3$ in 1250 cm$^{-1}$, and they supported a structure of Formula (b). Accordingly, it was judged that the compound before trimethylsilylated had a structure of Formula (1-1):

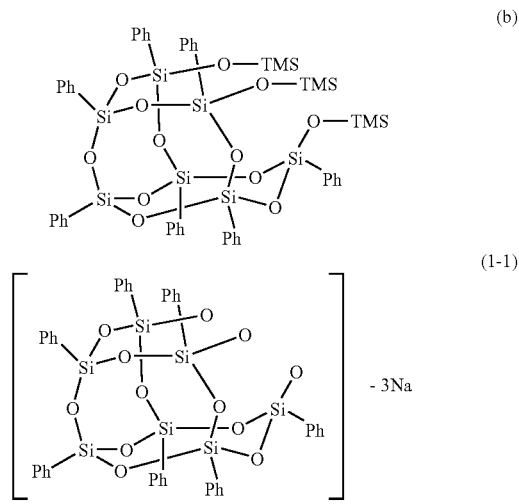

Example 3

Introduction of 3-(methacryloyloxy)propyl Group

A three neck flask having an inner volume of 300 ml equipped with a dropping funnel, a reflux condenser and a thermometer was charged with Compound (1-1) (10 g) synthesized in Example 1, THF (200 ml) and triethylamine (1.5 g) and sealed under dry nitrogen. 3-(Methacryloyloxy) propyltrichlorosilane (3.9 g) was dropwise added at a room temperature while stirring by means of a magnetic stirrer. After finishing dropwise adding, stirring was further continued at a room temperature for one hour to complete the reaction. Then, deionized water (50 g) was added thereto to dissolve by-produced sodium chloride and hydrolyze unreacted 3-(methacryloyloxy)propyltrichlorosilane. The organic layer obtained by separating operation was washed with water and dried on anhydrous magnesium sulfate, and then it was concentrated under reduced pressure by means of a rotary evaporator to obtain a crude product. This was recrystallized from ethyl acetate and dried to obtain a white powder solid matter (6.6 g).

The white powder solid matter thus obtained was subjected to structural analysis by means of GPC, $^1$H-NMR, $^{29}$Si-NMR, IR analysis and mass spectrum, and the following results were obtained. It was confirmed from the GPC chart that the white powder solid matter was monodispersed and that it had a weight average molecular weight of 800 (no correction) in terms of polystyrene and a purity of 99% by weight. It was confirmed from the $^1$H-NMR chart that a phenyl and a terminal double bond of methacryloyloxy were present in an integral ratio of 35:2. It was confirmed from the $^{29}$Si-NMR chart that three kinds of peaks originating in a T structure having a 3-(methacryloyloxy)propyl group and a T structure having phenyl were present in a ratio of 1:4:3. It was confirmed from the IR spectrum measured by a KBr tablet method that present in the spectrum of the white powder solid matter obtained above were absorptions attributed respectively to deformation vibration of Si—Ph in 1430 and 1590 cm$^{-1}$, harmonic vibration of a substituted benzene ring in 1960 to 1760 cm$^{-1}$, stretching vibration of Si—O—Si in 1200 to 950 cm$^{-1}$, vibration of C=O in 1720 cm$^{-1}$ and vibration of C=C in 1640 and 1450 cm$^{-1}$. A parent ion peak of m/z1082 was confirmed from the mass spectrum. These data supported a structure represented by Formula (8):

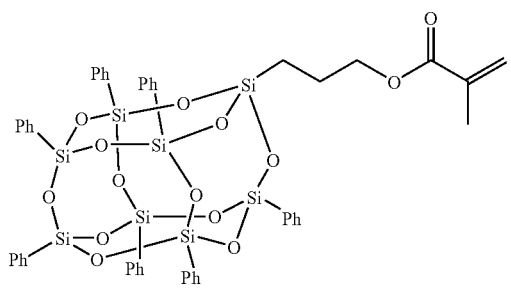

(8)

Example 4

Introduction of Cyanoethyl Group

A three neck flask having an inner volume of 300 ml equipped with a dropping funnel, a reflux condenser and a thermometer was charged with Compound (1-1) (10 g) synthesized in Example 1, THF (200 ml) and triethylamine (1.5 g) and sealed under dry nitrogen.

Cyanoethyltrichlorosilane (2.8 g) was dropwise added at a room temperature while stirring by means of a magnetic stirrer. After finishing dropwise adding, stirring was further continued at a room temperature for one hour to complete the reaction. Then, deionized water (50 g) was added thereto to dissolve by-produced sodium chloride and hydrolyze unreacted cyanoethyltrichlorosilane. The organic layer obtained by separating operation was washed with water and dried on anhydrous magnesium sulfate, and then it was concentrated under reduced pressure by means of a rotary evaporator to obtain a crude product. This was washed with methanol and dried to obtain a white powder solid matter (6.1 g).

The white powder solid matter thus obtained was subjected to structural analysis by means of GPC, $^1$H-NMR, $^{29}$Si-NMR and IR analysis, and the following results were obtained. It was confirmed from the GPC chart that the white powder solid matter was monodispersed and that it had a weight average molecular weight of 730 (no correction) in terms of polystyrene and a purity of 99% by weight. It was confirmed from the $^1$H-NMR chart that phenyl and an ethylene group in a cyanoethyl group were present in an integral ratio of 35:2. It was confirmed from the $^{29}$Si-NMR chart that three kinds of peaks originating in a T structure having a cyanoethyl group and a T structure having phenyl were present in a ratio of 1:4:3. These data indicate a structure of Formula (5):

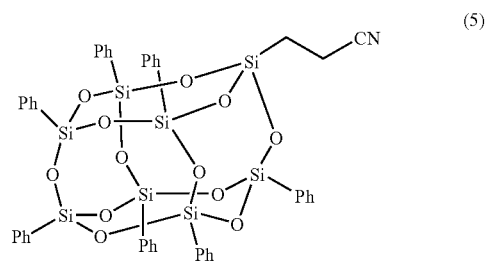

(5)

Example 5

Introduction of Si—H Group

A three neck flask having an inner volume of 300 ml equipped with a dropping funnel, a reflux condenser and a thermometer was charged with Compound (1-1) (10 g) synthesized in Example 1, THF (200 ml) and triethylamine (1.5 g) and sealed under dry nitrogen. Trichlorosilane (2 g) was dropwise added at a room temperature while stirring by means of a magnetic stirrer. After finishing dropwise adding, stirring was further continued at a room temperature for one hour to complete the reaction. Then, deionized water (50 g) was added thereto to dissolve by-produced sodium chloride and hydrolyze unreacted trichlorosilane. The organic layer obtained by separating operation was washed with water and dried on anhydrous magnesium sulfate, and then it was concentrated under reduced pressure by means of a rotary evaporator to obtain a crude product. This was recrystallized from acetone and dried to obtain a white powder solid matter (5 g).

The white powder solid matter thus obtained was subjected to structural analysis by means of GPC, $^1$H-NMR, $^{29}$Si-NMR, IR analysis and mass spectrum, and the following results were obtained. It was confirmed from the GPC chart that the white powder solid matter was monodispersed and that it had a weight average molecular weight of 750 (no correction) in terms of polystyrene and a purity of 95% by weight. It was confirmed from the $^1$H-NMR chart that phenyl and a hydrogen group were present in an integral ratio of 35:1. It was confirmed from the $^{29}$Si-NMR chart that three kinds of peaks originating in a T structure having a hydrogen group and a T structure having phenyl were present in a ratio of 1:4:3. It was confirmed from the IR spectrum measured by a KBr tablet method that present in the spectrum of the white powder solid matter obtained above were absorptions attributed respectively to deformation vibration of Si—Ph in 1430 and 1590 cm$^{-1}$, harmonic vibration of a substituted benzene ring in 1960 to 1760 cm$^{-1}$, stretching vibration of Si—O—Si in 1200 to 950 cm$^{-1}$ and vibration of Si—H in 2260 cm$^{-1}$. A parent ion peak of m/z956 was confirmed from the mass spectrum. These data indicate a structure of Formula (4):

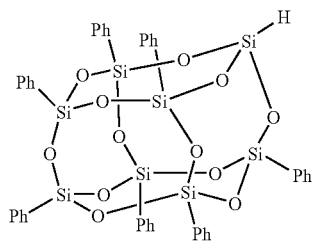

(4)

Example 6

Introduction of Vinyl Group

A three neck flask having an inner volume of 300 ml equipped with a dropping funnel, a reflux condenser and a thermometer was charged with Compound (1-1) (10 g) synthesized in Example 1, THF (200 ml) and triethylamine (1.5 g) and sealed under dry nitrogen.

Vinyltrichlorosilane (2.4 g) was dropwise added at a room temperature while stirring by means of a magnetic stirrer. After finishing dropwise adding, stirring was further continued at a room temperature for one hour to complete the reaction. Then, deionized water (50 g) was added thereto to dissolve by-produced sodium chloride and hydrolyze unreacted vinyltrichlorosilane. The organic layer obtained by separating operation was washed with water and dried on anhydrous magnesium sulfate, and then it was concentrated under reduced pressure by means of a rotary evaporator to obtain a crude product. This was recrystallized and then dried to obtain a white powder solid matter (6 g).

The white powder solid matter thus obtained was subjected to structural analysis by means of $^1$H-NMR, $^{29}$Si-NMR, IR analysis and mass spectrum, and the following results were obtained. It was confirmed from the $^1$H-NMR chart that phenyl and a terminal double bond of a vinyl group were present in an integral ratio of 35:2. It was confirmed from the $^{29}$Si-NMR chart that three kinds of peaks originating in a T structure having a vinyl group and a T structure having phenyl were present in a ratio of 1:4:3. These data indicate a structure of Formula (7):

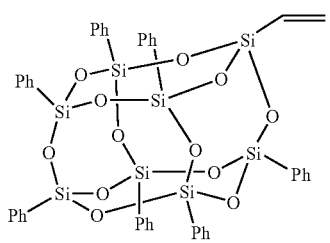

(7)

Example 7

Introduction of 3-chloropropyl Group

A three neck flask having an inner volume of 300 ml equipped with a dropping funnel, a reflux condenser and a thermometer was charged with Compound (1-1) (10 g) synthesized in Example 1, THF (200 ml) and triethylamine (1.5 g) and sealed under dry nitrogen. 3-Chloropropyltrichlorosilane (3.2 g) was dropwise added at a room temperature while stirring by means of a magnetic stirrer. After finishing dropwise adding, stirring was further continued at a room temperature for one hour to complete the reaction. Then, deionized water (50 g) was added thereto to dissolve by-produced sodium chloride and hydrolyze unreacted 3-chloropropyltrichlorosilane. The organic layer obtained by separating operation was washed with water and dried on anhydrous magnesium sulfate, and then it was concentrated under reduced pressure by means of a rotary evaporator to obtain a crude product. This was washed with methanol, then recrystallized from ethyl acetate and dried to obtain a white powder solid matter (6.3 g).

The white powder solid matter thus obtained was subjected to structural analysis by means of GPC, $^1$H-NMR and $^{29}$Si-NMR, and the following results were obtained. It was confirmed from the GPC chart that the white powder solid matter was monodispersed and that it had a weight average molecular weight of 740 (no correction) in terms of polystyrene and a purity of 99% by weight. It was confirmed from the $^1$H-NMR chart that phenyl and an ethylene group in a 3-chloropropyl group were present in an integral ratio of 35:2. It was confirmed from the $^{29}$Si-NMR chart that three kinds of peaks originating in a T structure having a 3-chloropropyl group and a T structure having phenyl were present in a ratio of 1:4:3. These data indicate a structure of Formula (6).

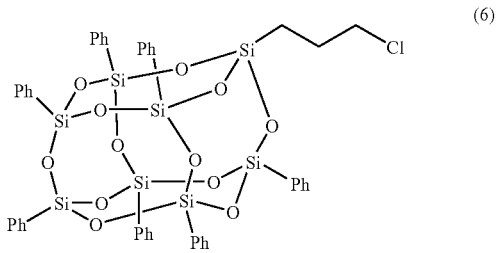

(6)

Example 8

Introduction of 3-cyclohexenylethyl Group

The compound (1-1) synthesized in the same manner as in Example 1 is reacted with 2-(3-cyclohexenyl)ethyltrichlorosilane according to Example 3, whereby a compound represented by Formula (9) can be synthesized:

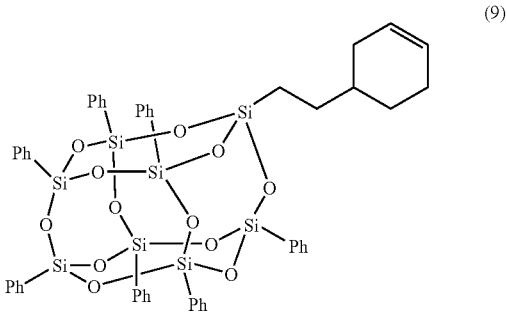

(9)

Example 9

Introduction of 3,4-epoxycyclohexylethyl Group

The compound synthesized in Example 8 is used to apply a method described in J. Polym. Sci. Part A: Polym. Chem, 1997, 35 (3), 407, whereby a compound represented by Formula (10) can be synthesized:

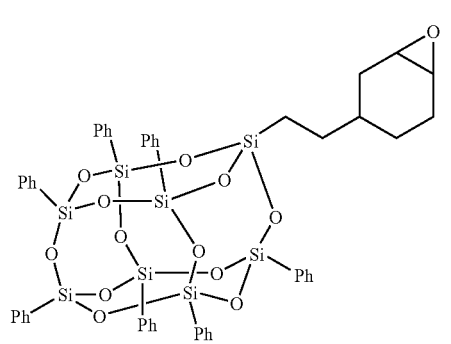

(10)

Example 10

Introduction of 3,4-dihydroxycyclohexylethyl Group

The compound synthesized in Example 9 is used to apply a method described in Toxicol. Environ. Chem, 1996, 57 (1-4), 153, whereby a compound represented by Formula (11) can be synthesized:

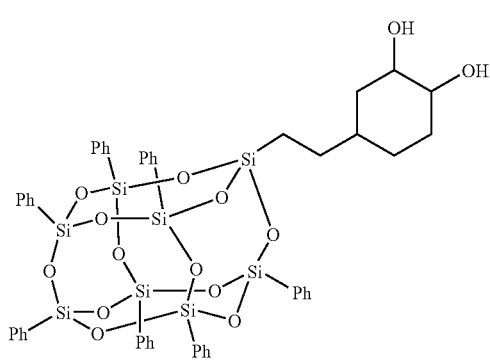

(11)

Example 11

Introduction of 3,4-diacryloyoxycyclohexylethyl Group

Methylene chloride, acrylic acid and 4-dimethylaminopyrimidine are added to the compound obtained in Example 10 and stirred at a room temperature. Then, N,N-dicyclohexylcarbodiimide dissolved in methylene chloride is added thereto and stirred at a room temperature for 3 days, and then diethyl ether is added to filter off dicyclohexylurea. A saturated aqueous salt solution is added to the filtrate and stirred, and then the solution is subjected to separating operation to separate an organic layer. This organic layer is washed in order with hydrochloric acid and a saturated sodium hydrogencarbonate aqueous solution, and then it is dried on anhydrous sodium sulfate. The solvent is distilled off from this organic layer under reduced pressure, whereby a compound represented by Formula (12) can be synthesized.

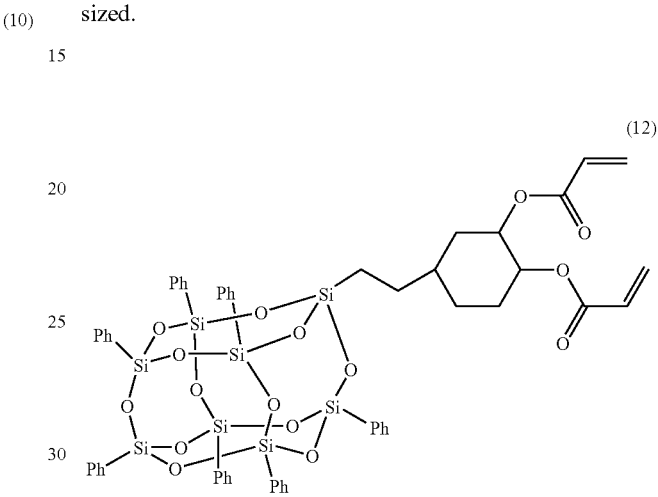

(12)

Example 12

Introduction of n-propyl Group

A four neck flask having an inner volume of 100 ml equipped with a dropping funnel, a reflux condenser and a thermometer was charged with Compound (1-1) (1.0 g) obtained in Example 1, THF (20 ml) and triethylamine (0.12 g) and sealed under dry nitrogen. n-Propyltrichlorosilane (0.213 g) was dropwise added while stirring by means of a magnetic stirrer. After finishing dropwise adding, stirring was further continued at a room temperature for one hour to complete the reaction. Then, deionized water (20 g) was added thereto to dissolve by-produced sodium chloride and hydrolyze unreacted n-propyltrichlorosilane. The organic layer obtained by separating operation was washed with water and dried on anhydrous magnesium sulfate, and then it was concentrated under reduced pressure by means of a rotary evaporator to obtain a crude product. This was recrystallized from toluene and dried to obtain a white powder solid matter (0.49 g). The yield calculated from the charged amount was 49%.

The white powder solid matter thus obtained was analyzed by means of GPC and $^1$H-NMR, and as a result thereof, it was confirmed from the GPC chart that the weight average molecular weight was 686 (no correction) in terms of polystyrene and that the purity was 99% by weight or more. It was confirmed from the $^1$H-NMR chart that phenyl and an n-propyl group were present in a ratio of 7:1. It was confirmed from these data that the white powder solid matter obtained had a structure represented by Formula (13):

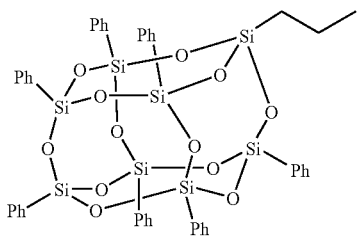

(13)

Comparative Example 1

Introduction of n-propyl Group

An n-propyl group was tried to introduce by a method according to Example 12, except that a compound (0.93 g) represented by Formula (a-1) manufactured by Hybrid Plastics Co, Ltd. was substituted for the compound (1-1). However, the solid matter obtained in Example 12 was not obtained. That is, when using the compound (a-1), an alkaline component for accelerating the reaction by capturing HCl has to be indispensably present. Considering this fact and that the compound (1-1) is produced more easily than the compound (a-1), it is apparent that the process of the present invention is more excellent:

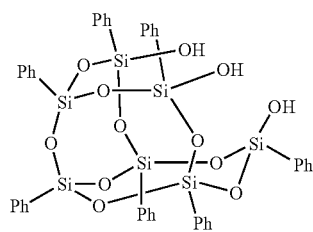

(a-1)

Example 13

Production of Compound (1-2)

A four neck flask having an inner volume of one liter equipped with a reflux condenser, a thermometer and a dropping funnel was charged with trifluoropropyltrimethoxysilane (100 g), THF (500 ml), deionized water (10.5 g) and sodium hydroxide (7.9 g), and it was heated in an oil bath from a room temperature up to a temperature at which THF was refluxed while stirring by means of a magnetic stirrer. Stirring was continued for 5 hours since refluxing started to complete the reaction. Then, the flask was pulled up from the oil bath and left standing still at a room temperature for a night, and then it was set again in the oil bath to carry out heating and concentrating under atomospheric pressure until a solid matter was deposited. The deposited product was separated by means of a pressure filter equipped with a membrane filter having a pore diameter of 0.5 μm. Then, the solid matter thus obtained was washed once with THF and dried at 80° C. for 3 hours in a vacuum dryer to obtain a white powder solid matter of 74 g.

Confirmation of Structure of Compound (1-2)

A four neck flask having an inner volume of 50 ml equipped with a dropping funnel, a reflux condenser and a thermometer was charged with the white powder solid matter (1.0 g) described above, THF (10 g) and triethylamine (1.0 g), and sealed under dry nitrogen. Chlorotrimethylsilane (3.3 g) was dropwise added at a room temperature in about one minute while stirring by means of a magnetic stirrer. After finishing dropwise adding, stirring was further continued at a room temperature for 3 hours to complete the reaction. Then, the same treatment as in the confirmation of the structure of Compound (1-1) in Example 2 was carried out to obtain a white powder solid matter of 0.9 g.

The white powder solid matter thus obtained was subjected to structural analysis by means of GPC, $^1$H-NMR, $^{29}$Si-NMR and $^{13}$C-NMR. It was confirmed from the GPC chart that the white powder solid matter showed monodispersibility and that it had a weight average molecular weight of 1570 in terms of polystyrene and a purity of 98% by weight. It was confirmed from the $^1$H-NMR chart that a trifluoropropyl group and a trimethylsilyl group were present in an integral ratio of 7:3. It was confirmed from the $^{29}$Si-NMR chart that three peaks originating in a T structure having a trifluoropropyl group were present in a ratio of 1:3:3 and that one peak originating in a trimethylsilyl group was present in 12.11 ppm. It was confirmed from the $^{13}$C-NMR chart that peaks originating in a trifluoropropyl group were present in 131 to 123 ppm, 28 to 27 ppm and 6 to 5 ppm and that a peak originating in a trimethylsilyl group was present in 1.4 ppm. These values show that the white powder solid matter which is a target for the structural analysis has a structure of Formula (c). Accordingly, it is judged that the compound before subjected to trimethylsilylation has a structure of Formula (1-2):

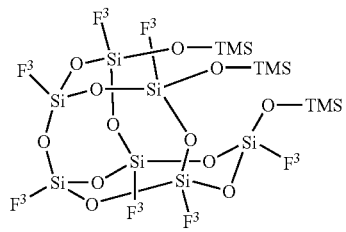

(c)

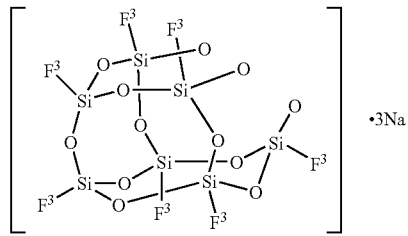

(1-2)

$F^3$ in Formula (c) and Formula (1-2) is —$CH_2CH_2CF_3$.

Example 14

Introduction of 3-(methacryloyloxy)propyl Group

A three neck flask having an inner volume of 100 ml equipped with a reflux condenser and a thermometer was charged with Compound (1-2) (2.85 g) produced in Example 13, THF (50 g) and triethylamine (0.4 g), and sealed under dry argon. 3-(Methacryloyloxy)propyltrichlorosilane (1.0 g) was dropwise added at a room temperature while stirring by means of a magnetic stirrer. After finishing dropwise adding, stirring was further continued at a room temperature for 3 hours to complete the reaction. The reaction mixture was subjected to pressurized filtration (argon pressure: 0.2 to 0.3 MPa and PTFF-made membrane filter: 0.1 μm) to thereby remove by-produced sodium chloride, and then the filtrate was concentrated to one tenth, followed by adding methanol (150 g) to obtain a deposit. The deposit mixture was stirred for one hour and then filtrated by means of a suction filter equipped with a membrane filter having a pore diameter of 0.1 μm. The resulting solid matter component was dried at 80° C. for 3 hours in a vacuum dryer to obtain a white powder solid matter (1.6 g).

The white powder solid matter thus obtained was subjected to structural analysis by means of GPC, $^1$H-NMR, $^{29}$Si-NMR and $^{13}$C-NMR, and the following results were obtained. It was confirmed from the GPC chart that the white powder solid matter was monodispersed and that it had a weight average molecular weight of 1430 (no correction) in terms of polystyrene and a purity of 99% by weight. It was confirmed from the $^1$H-NMR chart that trifluoropropyl and a terminal double bond of methacryloyloxy were present in an integral ratio of 28:2. It was confirmed from the $^{29}$Si-NMR chart that three kinds of peaks originating in a T structure having a 3-(methacryloyloxy)propyl group and a T structure having phenyl were present in a ratio of 1:4:3. It was confirmed from the $^{13}$C-NMR chart that peaks originating in a 3-(methacryloyloxy)propyl group were present in 167 to 125 ppm and 68 to 4 ppm and that peaks originating in a trifluoropropyl group was present in 131 to 123 ppm. A structure represented by Formula (14) was supported by these data:

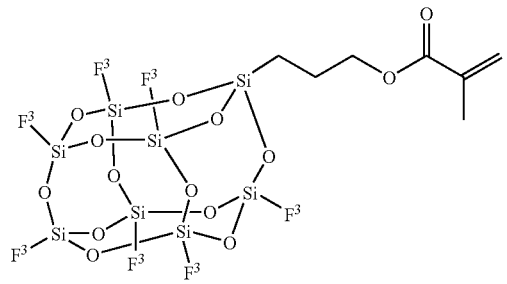

(14)

$F^3$ in Formula (14) is —$CH_2CH_2CF_3$.

Example 15

Production (1) of Compound (1-3)

A four neck flask having an inner volume of 200 ml equipped with a reflux condenser, a thermometer and a dropping funnel was charged with cyclopentyltrimethoxysilane (19.0 g), THF (100 ml), sodium hydroxide (1.7 g) and deionized water (2.3 g), and it was heated while stirring by means of a magnetic stirrer. Stirring was continued for 10 hours since refluxing started at 67° C. to complete the reaction. Then, the flask was pulled up from the oil bath and left standing still at a room temperature for a night to completely deposit a solid matter formed. The deposited solid matter was separated by filtration and dried under vacuum to obtain a powder solid matter of 4.2 g.

Confirmation of Structure of Compound (1-3)

A four neck flask having an inner volume of 100 ml equipped with a reflux condenser was charged with the powder solid matter (1.0 g) described above, THF (30 ml), triethylamine (0.5 g) and trimethylchlorosilane (0.7 g) and stirred at a room temperature for 2 hours while stirring by means of a magnetic stirrer. After finishing the reaction, the same treatment as in the confirmation of the structure of Compound (1-1) in Example 2 was carried out to obtain a powder solid matter of 0.9 g.

The powder solid matter thus obtained was subjected to structural analysis by means of $^1$H-NMR, $^{29}$Si-NMR and X ray crystalline structure analysis. It was confirmed from the $^1$H-NMR that a cyclopentyl group and a trimethylsilyl group were present in an integral ratio of 7:3. Confirmed from the $^{29}$Si-NMR were a peak of 8.43 ppm originating in a trimethylsilyl group and three kinds of peaks of −66.37 ppm, −67.97 ppm and −67.99 originating in a T structure having a cyclopentyl group. A ratio of the sum of the peak strengths in −67.97 ppm and −67.99 to the peak strengths in −66.37 ppm was 6:1. It was confirmed from these results and the crystalline structure obtained by the X ray crystalline structure analysis that the powder solid matter which was a target for the analysis was a silicon compound represented by Formula (d). Accordingly, it was indicated that the compound obtained in Example 15 had a structure shown by Formula (1-3):

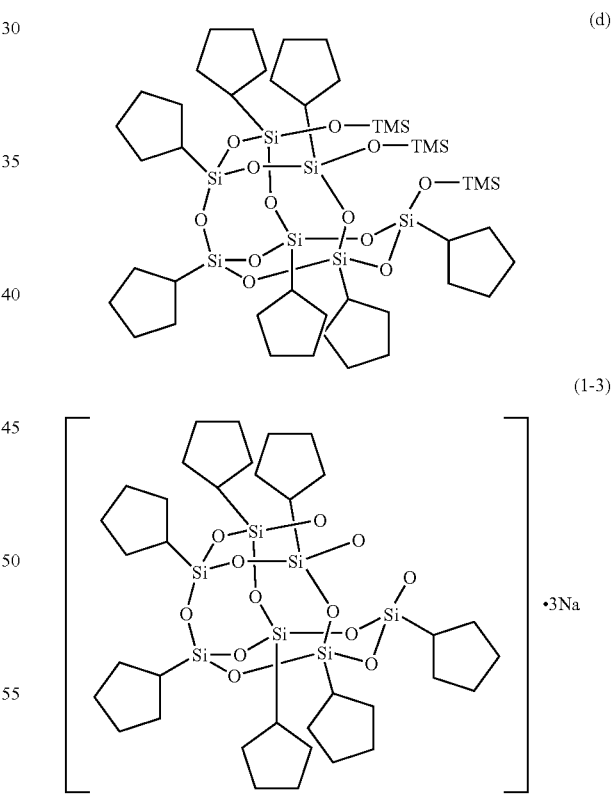

Example 16

Production (2) of Compound (1-3)

A separable four neck flask having an inner volume of 100 ml equipped with a reflux condenser, a thermometer and a dropping funnel was charged with toluene (10.0 g) and deionized water (5.0 g). Then, a mixed solution of cyclopentyltrimethoxysilane (10.0 g) and toluene (10.0 g) was dropwise added thereto in 30 minutes while stirring by means of a magnetic stirrer and further stirred at a room temperature for 2 hours. Thereafter, a 5.0 weight % aqueous solution (1.0 ml) of sodium hydroxide was added thereto and heated up to the refluxing temperature, and the solution was further stirred for 2 hours to complete the reaction. The solution was cooled down to a room temperature and then washed with water, and it was concentrated under reduced pressure to obtain a residue (5.1 g). The residue thus obtained was analyzed by means of GPC to find that it was a solid matter having a weight average molecular weight of 1190 in terms of polystyrene.

A four neck flask having an inner volume of 200 ml equipped with a reflux condenser and a thermometer was charged with the residue (2.8 g) described above, THF (50 ml) and sodium hydroxide (0.4 g), and the mixture was heated under refluxing at 67° C. while stirring by means of a magnetic stirrer. Stirring was continued for 17 hours since refluxing started to complete the reaction. Then, the flask was pulled up from the oil bath and left standing still at a room temperature for a night. The deposited solid matter was separated by filtration and dried under vacuum to obtain a powder solid matter of 0.3 g. This powder solid matter was subjected to structural analysis, and as a result thereof, it was estimated that this compound had the structure shown by Formula (1-3) as with the compound obtained in Example 15.

Example 17

Production (3) of Compound (1-3)

A four neck flask having an inner volume of 100 ml equipped with a reflux condenser, a thermometer and a dropping funnel was charged with cyclopentyltrimethoxysilane (5.0 g), 2-propanol (30 ml), sodium hydroxide (0.7 g) and deionized water (0.6 g), and it was heated while stirring by means of a magnetic stirrer. Stirring was continued for 5 hours since refluxing started at 77° C. to complete the reaction. Then, the solvent was removed under heating at 80° C. by means of an evaporator to obtain a powder solid matter of 3.6 g. This powder solid matter was subjected to structural analysis, and as a result thereof, it was estimated that this compound had the structure shown by Formula (1-3) as with the compound obtained in Example 15.

Example 18

Production of Compound (1-4)

A four neck flask having an inner volume of 200 ml equipped with a reflux condenser, a thermometer and a dropping funnel was charged with isobutyltrimethoxysilane (18.7 g), THF (100 ml), sodium hydroxide (1.8 g) and deionized water (2.4 g), and it was heated while stirring by means of a magnetic stirrer. Stirring was continued for 10 hours since refluxing started at 67° C. to complete the reaction. The reaction solution was concentrated under atomospheric pressure until a solid matter was deposited, and then the resulting concentrate was left standing still at a room temperature for a night to completely deposit a solid matter. This solid matter was separated by filtration and dried under vacuum to obtain a powder solid matter of 5.1 g.

Confirmation of Structure of Compound (1-4)

A four neck flask having an inner volume of 200 ml equipped with a reflux condenser was charged with the powder solid matter (1.0 g) described above, THF (20 ml), triethylamine (0.5 g) and trimethylchlorosilane (0.8 g). And the mixture was stirred by means of a magnetic stirrer at a room temperature for 2 hours. After finishing the reaction, the same treatment as in the confirmation of the structure of Compound (1-1) in Example 2 was carried out to obtain a powder solid matter of 0.9 g.

The powder solid matter described above was subjected to structural analysis by means of $^1$H-NMR and $^{29}$Si-NMR. It was confirmed from the $^1$H-NMR chart that an isobutyl group and a trimethylsilyl group were present in an integral ratio of 7:3. It was confirmed from the $^{29}$Si-NMR chart a peak of 8.72 ppm originating in a trimethylsilyl group was present and that three kinds of peaks of −67.38 ppm, −68.01 ppm and −68.37 ppm originating in a T structure having an isobutyl group were present in a ratio of 1:3:3. It was confirmed from these results that the powder solid matter which was a target for the analysis was a silicon compound represented by Formula (e). Accordingly, it was indicated that the compound obtained in Example 18 had a structure represented by Formula (1-4):

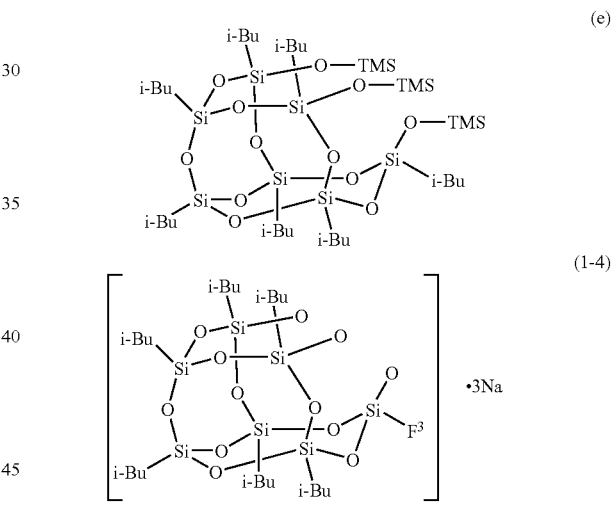

Example 19

Production of Compound (1-5)

A four neck flask having an inner volume of 50 ml equipped with a reflux condenser, a thermometer and a dropping funnel was charged with tridecafluoro-1,1,2,2-tetrahydrooctyltriethoxysilane (4.9 g), THF (15 ml), sodium hydroxide (0.2 g) and deionized water (0.2 g). The mixture was refluxed by heating at 75° C. while stirring by means of magnetic stirrer. Stirring was continued for 5 hours since refluxing started to complete the reaction. Then, the flask was pulled up from the oil bath and left standing still at a room temperature for a night, and then it was set again in the oil bath to carry out heating and concentrating under atomospheric pressure until a solid matter was deposited. The deposited product was separated by means of a pressure filter equipped with a membrane filter having a pore diameter of 0.5 μm. Then, the solid matter thus obtained was washed once with THF and dried at 80° C. for 3 hours in a vacuum dryer to obtain a white powder solid matter of 4.0 g.

Confirmation of Structure of Compound (1-5)

A three neck flask having an inner volume of 50 ml was charged with the white powder solid matter (2.6 g) described above, THF (10 g), triethylamine (1.0 g) and trimethylchlorosilane (3.3 g). And the mixture was stirred by means of a magnetic stirrer at a room temperature for 3 hours. After finishing the reaction, the same treatment as in the confirmation of the structure of Compound (1-1) in Example 2 was carried out to obtain a powder solid matter of 1.3 g.

The powder solid matter thus obtained was analyzed by means of GPC. As the result, it was confirmed that the white powder solid matter was monodispersed and that it had a weight average molecular weight of 3650 (no correction) in terms of polystyrene and a purity of 100% by weight. Synthetically judging this result and the results obtained in Examples 1, 13, 15 and 18, it was estimated that the powder solid matter which was a target for the analysis was a silicon compound represented by Formula (f). Accordingly, it was judged that the compound obtained in Example 19 had a structure represented by Formula (1-5):

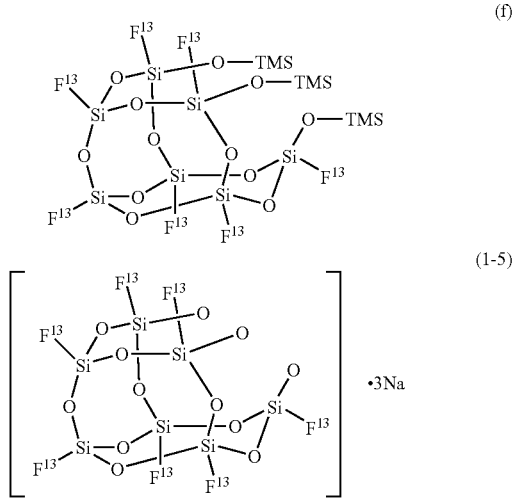

$F^{13}$ in Formula (f) and Formula (1-5) is —$CH_2CH_2(CF_2)_5CF_3$.

Use of Compound (1-2), Compound (1-3), Compound (1-4) or Compound (1-5) makes it possible to derive the respective compounds into compounds having an Si—H group in the same manner as in Example 5. The silsesquioxane derivatives having various functional groups can readily be produced from these compounds having an Si—H group.

INDUSTRIAL APPLICABILITY

Provided according to the present invention is a process in which a functional group-containing silsesquioxane derivative represented by Formula (2) can readily be produced at a high yield. Further, the novel functional group-containing silsesquioxane derivative of the present invention can easily be introduced into general purpose resins by various methods, and therefore it is very useful as a reaction intermediate raw material for reforming a heat resistance, a light fastness, a water resistance, a stretching characteristic and the like of conventional resins.

The invention claimed is:

1. A silsesquioxane derivative represented by Formula (2):

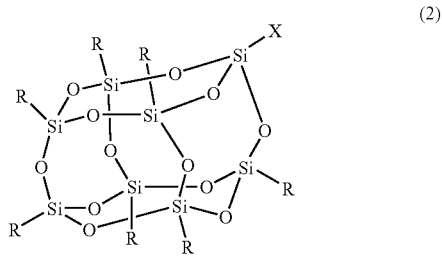

wherein R is trifluoropropyl, nonafluoro-1,1,2,2-tetrahydrohexyl or tridecafluoro-1,1,2,2-tetrahydrooctyl; and X is hydrogen, chlorine, a functional group or a group having a functional group;

provided that X is not any of a group having a hydroxy group which is not bonded directly to Si, a group having alkanoyloxy, a group having halogenated sulfonyl and a group having an α-haloester group.

2. The silsesquioxane derivative according to claim 1, wherein R is trifluoropropyl.

3. The silsesquioxane derivative according to claim 1, wherein R is tridecafluoro-1,1,2,2-tetrahydrooctyl.

4. The silsesquioxane derivative according to claim 1, wherein X is hydrogen, chlorine, a hydroxy group, alkenyl, or a group having any of halogen, alkoxy, phenoxy, polyalkyleneoxy, —COOH, 2-oxapropane-1,3-dioyl, alkoxycarbonyl, alkenyloxycarbonyl, oxiranyl, 3,4-epoxycyclohexyl, oxetanyl, oxetanylene, —NH—, —$NH_2$, —CN, —NCO, alkenyl, alkynyl, cycloalkenyl, acryloyloxy, methacryloyloxy, —SH and —$PH_2$, provided that X is not any of a group having a hydroxy group which is not bonded directly to Si, a group having alkanoyloxy, a group having halogenated sulfonyl and a group having an α-haloester group.

5. The silsesquioxane derivative according to claim 1, wherein R is trifluoropropyl; and X is hydrogen, chlorine, a hydroxy group, alkenyl, or a group having any of halogen, alkoxy, phenoxy, polyalkyleneoxy, —COOH, 2-oxapropane-1,3-dioyl, alkoxycarbonyl, alkenyloxycarbonyl, oxiranyl, 3,4-epoxycyclohexyl, oxetanyl, oxetanylene, —NH—, —$NH_2$, —CN, —NCO, alkenyl, alkynyl, cycloalkenyl, acryloyloxy, methacryloyloxy, —SH and —$PH_2$, provided that X is not any of a group having a hydroxy group which is not bonded directly to Si, a group having alkanoyloxy, a group having halogenated sulfonyl and a group having an α-haloester group.

6. The silsesquioxane derivative according to claim 1, wherein R is tridecafluoro-1,1,2,2-tetrahydrooctyl; and X is hydrogen, chlorine, a hydroxy group, alkenyl, or a group having any of halogen, alkoxy, phenoxy, polyalkyleneoxy, —COOH, 2-oxapropane-1,3-dioyl, alkoxycarbonyl, alkenyloxycarbonyl, oxiranyl, 3,4-epoxycyclohexyl, oxetanyl, oxetanylene, —NH—, —NH$_2$, —CN, —NCO, alkenyl, alkynyl, cycloalkenyl, acryloyloxy, methacryloyloxy, —SH and —PH$_2$, provided that X is not any of a group having a hydroxy group which is not bonded directly to Si, a group having alkanoyloxy, a group having halogenated sulfonyl and a group having an α-haloester group.

7. A silsesquioxane derivative represented by Formula (14):

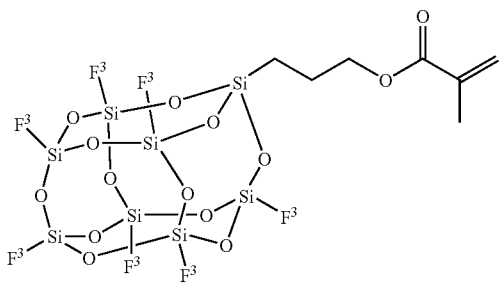

(14)

wherein F$^3$ is —CH$_2$CH$_2$CF$_3$.

UNITED STATES PATENT AND TRADEMARK OFFICE
CERTIFICATE OF CORRECTION

PATENT NO. : 7,235,619 B2 Page 1 of 1
APPLICATION NO. : 11/121076
DATED : June 26, 2007
INVENTOR(S) : Yoshitaka Morimoto et al.

It is certified that error appears in the above-identified patent and that said Letters Patent is hereby corrected as shown below:

On Title page (item 75), delete the following inventors:
Yoshitaka MORIMOTO,
Kenya ITO, and
Hisaoi OIKAWA Signed and Sealed this Thirtieth Day of October, 2007

JON W. DUDAS
*Director of the United States Patent and Trademark Office*